United States Patent [19]

Kanai et al.

[11] Patent Number: 4,612,425
[45] Date of Patent: Sep. 16, 1986

[54] STEERING WHEEL HAVING BOSS PORTION WITH ENERGY ABSORBING LAYER AND MEMBRANE SWITCH

[75] Inventors: Makoto Kanai, Nagoya; Hiroshi Sugita, Ichinomiya; Makoto Kawai, Nagoya, all of Japan

[73] Assignee: Toyoda Gosei Co., Ltd., Nishikasugai, Japan

[21] Appl. No.: 704,029

[22] Filed: Feb. 21, 1985

[30] Foreign Application Priority Data

Feb. 22, 1984 [JP] Japan .............................. 59-24352[U]

[51] Int. Cl.$^4$ .............................................. H01H 9/02
[52] U.S. Cl. ................................... 200/61.55; 74/552; 280/750

[58] Field of Search ............... 200/61.55, 86 R, 61.54; 74/552, 555.9, 492; 280/750

[56] References Cited

U.S. PATENT DOCUMENTS 4,200,777  4/1980  Miller ................................ 200/86 R
4,228,115 10/1980  Gardner et al. ............. 200/61.55 X
4,471,177  9/1984  Doughty .......................... 200/86 R Primary Examiner—A. D. Pellinen
Assistant Examiner—Morris Ginsburg
Attorney, Agent, or Firm—Cushman, Darby & Cushman

[57] ABSTRACT

A steering wheel including an energy absorbing layer formed on a boss portion of the steering wheel and a membrane switch disposed on the energy absorbing layer.

4 Claims, 3 Drawing Figures

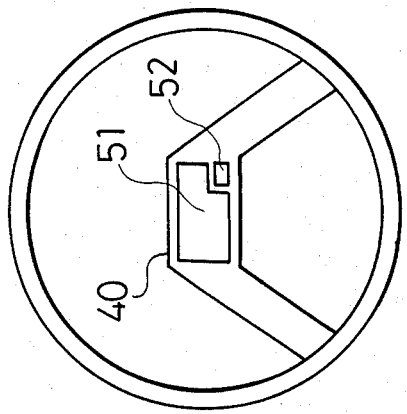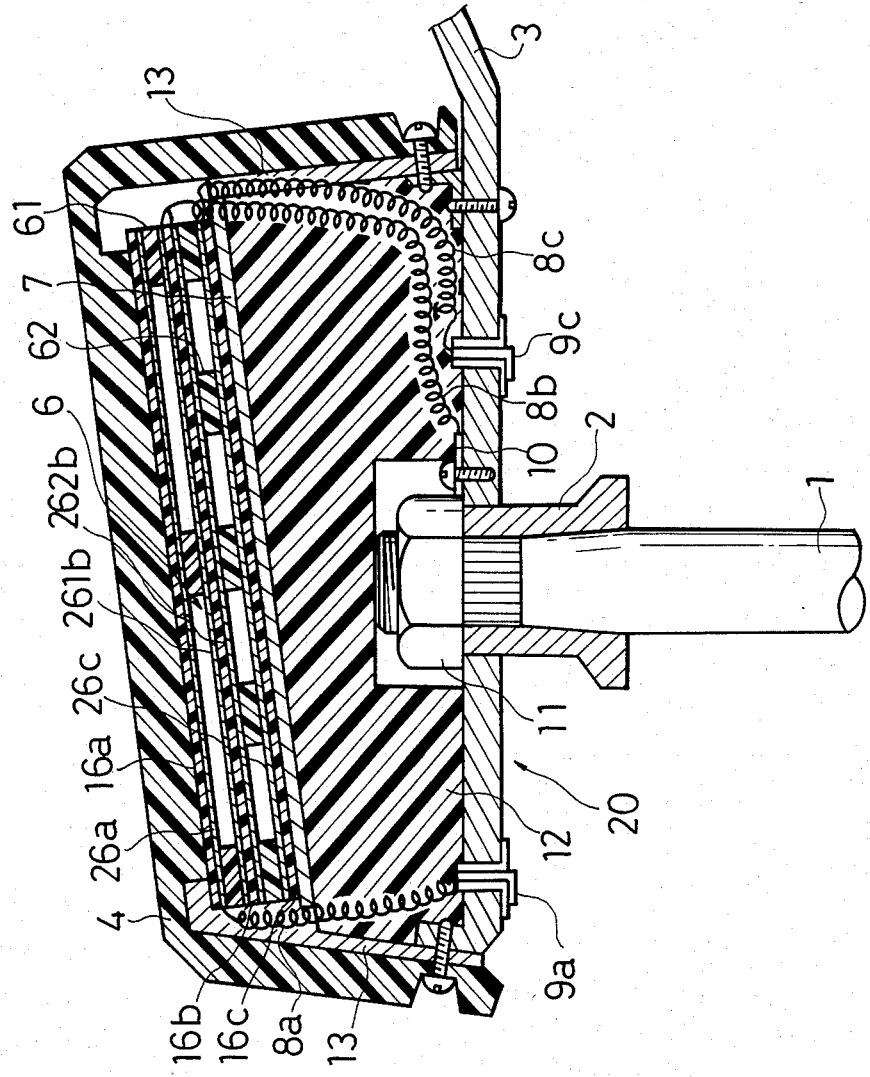

STEERING WHEEL HAVING BOSS PORTION WITH ENERGY ABSORBING LAYER AND MEMBRANE SWITCH

BACKGROUND OF THE INVENTION

1. Field of the Invention

The present invention relates to a steering wheel having an improved shock absorbability.

2. Description of the Prior Art

In connection with vehicular steering wheels, various energy absorbing mechanisms for absorbing a shock energy have heretofore been proposed. According to one proposal an energy absorbing member using a rigid polyurethane foam is provided at a boss portion of a steering wheel. But, even in this steering wheel having such energy absorbing mechanism, a horn switch employs a copper plate contact adapted to be automatically returned by the action of a spring, so a large mounting space for the horn switch is needed and therefore it is impossible to increase the capacity of the energy absorbing member.

SUMMARY OF THE INVENTION

The present invention has been accomplished for remedying such drawback, and it is a principal object thereof to provide a steering wheel having an improved energy absorbability.

It is another object of this invention to provide a steering wheel having an improved shock absorbability and a switch which is mounted in a narrow space to extend the space for an energy absorbing layer to be mounted in.

It is a further object of this invention to provide a steering wheel having an improved shock absorbability and a multi-function switch to operate a complex device.

A steering wheel includes an energy absorbing layer formed on a boss portion of the steering wheel and a membrane switch disposed on the absorbing layer. And the membrane switch comprises at least a pair of thin film electrodes.

So the mountain space occupied by the membrane switch becomes smaller and therefore the thickness of the energy absorbing layer can be made so much larger, and the energy absorbability can be so much improved.

DETAILED DESCRIPTION OF THE INVENTION

The present invention is firstly characteristic in that a boss portion of a steering wheel is formed with an energy absorbing layer. This energy absorbing layer may be formed of a rigid polyurethane foam, a metal or a liquid damper. These materials absorb a breakage shock through their plastic deformation and flowing viscosity resistance. Therefore, it is desirable that the energy absorbing layer be as thick as possible. The present invention is secondly characteristic in that a membrane switch comprising a pair of thin film electrodes is provided above the energy absorbing layer. The membrane switch is formed, for example, by vapor-depositing a metallic material such as aluminum, nickel or chromium on a plastic film to constitute a pair of contact electrodes and then disposing spacers therebetween. The spacers may be formed of a plastic material, paper or rubber. As a special example, even a pressure-sensitive conductive rubber may be used as the spacer material. The membrane switch is not limited to a single switch as a horn switch alone; it may be an integrated switch for performing various remote controls. In the case where it is used as an integrated switch, an upper portion of the membrane switch may be open directly to the outside air.

Since the membrane switch is formed above the boss portion, the mounting space occupied by the membrane switch becomes smaller and therefore the thickness of the energy absorbing layer can be made so much larger, that is, the energy absorbability can be so much improved. Moreover, since the membrane switch is made of a thin film-like soft material, even its breakage in the event of shock would not badly affect the energy absorbing layer (would not cause a change in energy absorbing characteristic).

BRIEF DESCRIPTION OF DRAWINGS

Other objects and features of the invention will become apparent to those skilled in the art as the disclosure is made in the following description of a preferred embodiment of the invention, as illustrated in the accompanying sheet of drawings, in which

FIG. 2 is a sectional view of a steering wheel according to a second embodiment of the present invention; and FIG. 3 is a plan view of a steering wheel according to a third embodiment of the present invention.

DESCRIPTION OF THE PREFERRED EMBODIMENTS

Figure 1:
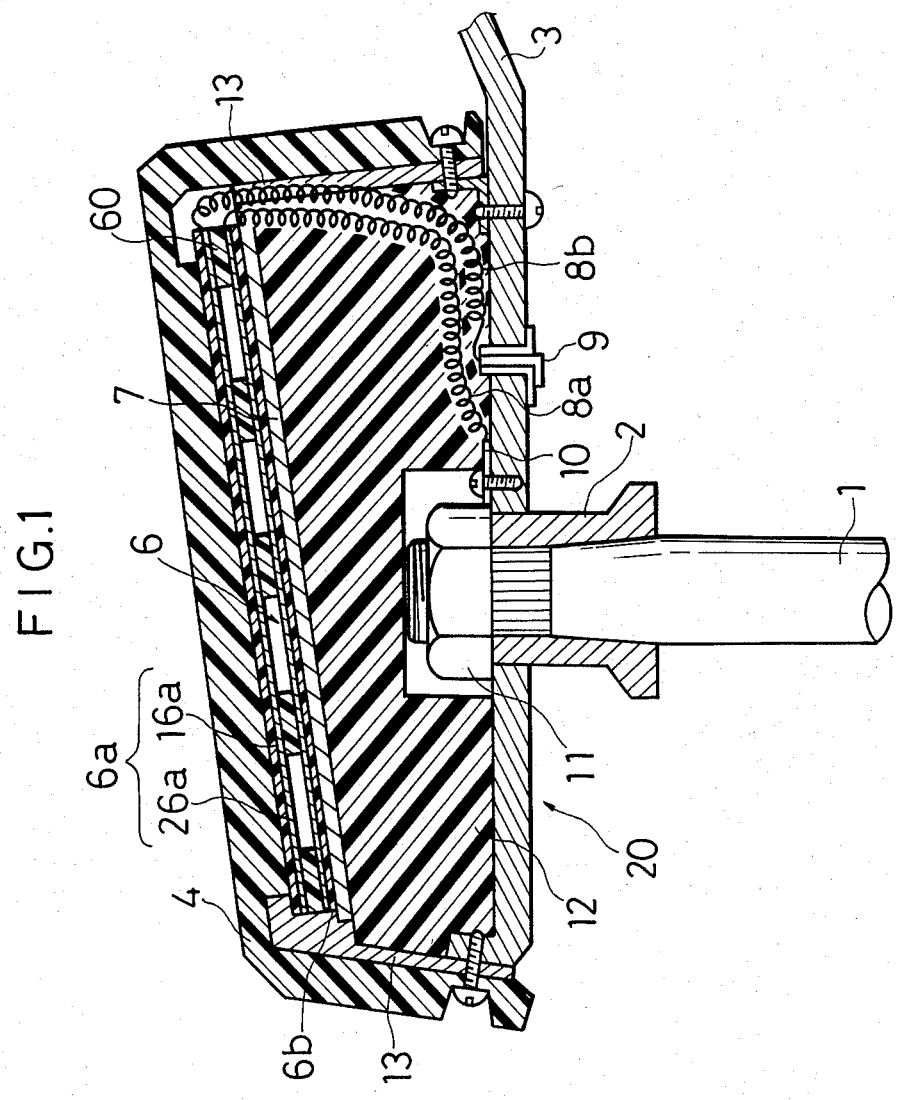
FIG. 1 is a sectional view illustrating a construction of a steering wheel according to an embodiment of the present invention.

The present invention will be described in more detail hereinunder on the basis of embodiments thereof.

FIG. 1 is a sectional view illustrating a characteristic portion of a steering wheel according to a first embodiment of the present invention, in which a steering wheel shaft 1 is connected through a steering boss 2 to a spoke 3 which is connected to a ring (not shown). The steering shaft 1 is tightened with a lock nut 11 and adapted to rotate with rotation of the spoke 3. A case 13 for enclosing therein an energy absorbing layer 12 is formed along a marginal part of the upper surface of the boss portion 20. An energy absorbing layer 12, which is disposed within the case 13, is formed of a rigid polyurethane foam. To the upper surface of the energy absorbing layer 12 is affixed a switch base 7, on which is disposed a membrane switch 6 having a thickness of 1 to 3 mm. The membrane switch 6 comprises a pair of thin film electrodes 6a and 6b and spacers 60 interposed therebetween at a predetermined spacing. The thin film electrode 6a comprises a plastic film 16a made of polyester film and thin metallic film 26a of aluminum vapor-deposited thereon. The spacers 60 are also formed of a polyester. To the electrodes 6a and 6b are connected lead wires 8b and 8a, respectively, which are drawn out to the exterior through the boss portion 20. The lead wire 8b is electrically connected to the vehicle battery through a contact ring 9, while the lead wire 8a is connected as an earth wire to a lead connection terminal 10 which is a metallic part leading to the boss portion 20. Further, the above and side portions of the membrane switch 6 as well as the energy absorbing layer 12 are covered with a pad cover 4. The steering wheel of this embodiment is thus constructed.

Referring now to FIG. 2, there is illustrated in sectional view a steering wheel according to a second embodiment of the present invention, which is different from the foregoing first embodiment in that a membrane switch 6 of a two-layer structure is used. More specifically, the membrane switch 6 comprises a first plastic film 16a, a second plastic film 16b and a third plastic film 16c, the second plastic film 16b being interposed between the first and third films 16a and 16c.

Metallic films 26a, and 26c and 261b, 262b, which are formed of aluminum, are vapor-deposited on the inner surfaces of the first and third films 16a and 16c and both faces of the second film 16b. The metallic films 26a and 26c are respectively connected to contact rings 9a and 9c through lead wires 8a and 8c, while the metallic film 261b and 262b are connected to an earth terminal 10 through a lead wire 8b. Further, spacers 61 comprising rubber plates are disposed between the first and second films 16a and 16b, and spacers 62 are disposed between the second and third films 16b and 16c. The spacers 61 are disposed in a smaller number than the spacers 62 in positions above the spacers 62. Therefore, the elastic constant between the first and second films 16a and 16b is smaller than the elastic constant between the second and third films 16b and 16c. Consequently, when the first film 16a is pressed, an electric conduction is made earlier between the metallic films 26a and 261b on the first and second films 16a and 16b than between the metallic films 262b and 26c on the second and third films 16b and 16c. Accordingly, when the pressing force is relatively small, an electric conduction is made between the first and second films 16a and 16b, while a large pressing force causes conduction between the first and second films 16a and 16b and also between the second and third films 16b and 16c. This phenomenon can be utilized for providing a multi-function switch for operating two kinds of different actuators. For example, during conduction between the first and second films, the vehicular horn is allowed to ring lightly for only a short time, and thus switch serves as a greeting horn switch, while during conduction between the second and third films, the switch serves to give the ordinary warning horn.

Referring now to FIG. 3, there is illustrated in plan view a steering wheel according to a third embodiment of the present invention, in which in a pad portion 40 of the steering wheel there are disposed a first membrane switch 51 and a second membrane switch 52 flushly in different positions. The membrane switch 51 and 52 are of the same structure as the membrane switch 6 in the first embodiment, and the other portions are also the same in structure as the first embodiment. Thus, the membrane switches 51 and 52 are employable as a main horn switch and a secondary horn switch, respectively. The secondary horn switch is for operating a horn device which has functions such as, for example, making a melody lightly.

In short, the present invention is characterized in that an energy absorbing layer is formed on a boss portion of a steering wheel and a membrane switch comprising a pair of thin film-like electrodes is disposed on the upper surface of the energy absorbing layer. Thus, since the switch portion of the steering wheel is constituted by the membrane switch, the switch thickness and the energy absorbing layer thickness can be made smaller and larger, respectively. Besides, there will be no change in energy absorption characteristic because the membrane switch is constituted by soft filmy electrodes.

What is claimed is:

1. A steering wheel having a boss portion and including:
    an energy absorbing layer formed on said boss portion, and
    a membrane switch disposed on said energy absorbing layer and comprising:
    superposed first, second and third plastic films, the second plastic film being interposed between the first and third plastic films,
    metallic films formed on the opposed surfaces of said plastic films, and
    spacers maintaining said metallic films at a predetermined spacing,
    the elastic constant between the first and second plastic films and that between the second and third plastic films being different thereby achieving electric conduction between the opposed metallic films on the first and second plastic films and between the opposed metallic films on the second and third plastic films at different timings upon exertion thereon of pressure from the first plastic film.

2. A steering wheel according to claim 1 wherein said energy absorbing layer comprises one of a rigid polyurethane foam, a metal and a liquid damper.

3. A steering wheel according to claim 1, wherein the spacers are formed of a pressure-sensitive rubber which exhibits electrical conductivity only when pressure is exerted thereon.

4. A steering wheel comprising a plate-like spoke connected to a steering shaft through a steering boss and contiguous to a ring;
    a case for enclosing therein an energy absorbing layer, said case being formed generally perpendicularly along a marginal part of a boss portion of said plate-like spoke which boss portion serves as a bottom of the case;
    an energy absorbing layer for absorbing a shock in the event of breakage, said energy absorbing layer being formed of a rigid polyurethane foam and disposed within said case;
    a switch base for fixing thereto a membrane switch, said switch base being disposed on the surface of said energy absorbing layer opposite said case bottom;
    a membrane switch disposed on said switch base, said membrane switch comprising at least a pair of superposed plastic films, thin metallic films formed on the opposed surfaces of said plastic films and spacers for maintaining said metallic films at a predetermined spacing;
    lead wires electrically connected to said thin metallic films, one of said lead wires being connected to an earth terminal provided on the boss portion of said plate-like spoke and another one of said lead wires being connected to a contact ring attached to said boss portion; and
    a pad cover which covers both said membrane switch and said case.

* * * * *